J. H. ROGERS.
METHOD AND APPARATUS FOR PRODUCING HIGH FREQUENCY OSCILLATING CURRENTS.
APPLICATION FILED JAN. 20, 1910.
958,829.
Patented May 24, 1910.
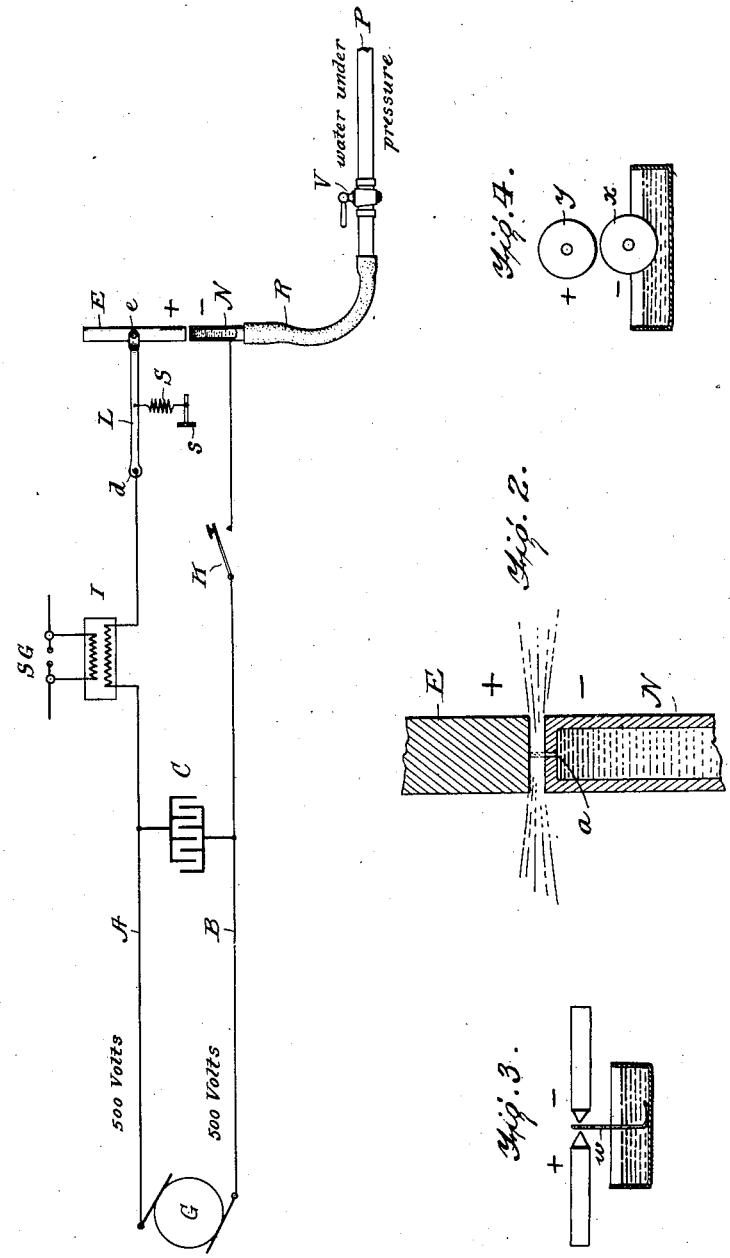
WITNESSES:
INVENTOR
JAMES H. ROGERS,
BY Edw. W. Byrn.
ATTORNEY

UNITED STATES PATENT OFFICE.

JAMES H. ROGERS, OF HYATTSVILLE, MARYLAND.

METHOD AND APPARATUS FOR PRODUCING HIGH-FREQUENCY OSCILLATING CURRENTS.

958,829.      Specification of Letters Patent.      Patented May 24, 1910.

Application filed January 20, 1910. Serial No. 538,962.

*To all whom it may concern:*

Be it known that I, JAMES H. ROGERS, a citizen of the United States, residing at Hyattsville, in the county of Prince George and State of Maryland, have invented certain new and useful Improvements in Methods and Apparatus for Producing High-Frequency Oscillating Currents, of which the following is a specification.

My invention is in the nature of a new method and apparatus for the production of high frequency oscillating currents adapted for the generation of electro-magnetic waves for use in transmitting in wireless telegraphy and telephony and in other applications.

Among the instrumentalities employed for this purpose is what is known as the "singing arc" to which my invention is only remotely related. Another means for producing such waves comprises a condenser whose opposite plates are connected to the opposite circuit wires of a source of electromotive force, which opposite circuit wires are also connected to two closely approximating electrode plates between which a thin strip of paper is moved and which furnishes such unstable resistance between said plates as to allow the discharging of the condenser through the same in rapid succession, such interruption of the discharges furnishing oscillations in the primary of an induction coil to set up wave oscillation between the poles of the secondary. My invention resembles this to some extent, but provides a new method and means for controlling the condenser discharges, the method consisting in connecting the electrodes by a limited and constantly supplied body of water or liquid of similar electrical value as to conductivity, preferably in the form of a minute jet of water passing in constant motion from one electrode to the other, as hereinafter more fully described with reference to the drawing, in which:

Figure 1 is a view partly diagrammatic and partly mechanical, showing my invention. Fig. 2 is an enlarged sectional view of the oscillation controlling electrodes, showing the connecting and constantly flowing jet of water, and Figs. 3 and 4 are modifications.

In the drawing G is a source of electromotive force, such as a generator capable of producing 500 volts.

A B are the opposite circuit wires between which is arranged a condenser C of large capacity, the opposite plates of which are respectively connected to the opposite circuit wires A B. The only communication between these circuit wires is an intermittent one through the two electrodes E and N, connected respectively to the opposite wires. The upper electrode E is mounted on trunnions $e$ in the fork of a lever L pivoted at $d$ and is drawn toward the other alined electrode N by a light spring S having a regulating screw $s$.

The electrode N is stationary and is constructed as a tube with a closed end flatly abutting the lower end of electrode E. Centrally in the end of the tubular electrode N is a minute issue orifice $a$, see Fig. 2, about the size of a pin hole. This electrode N is of metal and is connected by a rubber pipe R with a water pipe P which may be the service pipe of a city system or a pipe connected with any suitable elevated reservoir, or reservoir under air pressure. A valve V in the pipe P, or other suitable means, is provided for regulating the force with which the jet of water issues and cutting off the same.

In one of the circuit wires, as A, is interposed an induction coil I whose primary connects with the wire A and whose secondary is connected to the spark gap terminals S G to produce aerial oscillations. A key K is also employed for regulating the passage of current impulses through the electrodes. Now, when the key is closed and water pressure is turned on and the jet, issuing through the orifice $a$, leaps across and connects the electrodes N and E, said jet supplies a relative conductivity and resistance of an unbalanced character that allows the condenser C to rapidly discharge through the jet and thus produce such rapid interruption as to set up in the spark gap wave oscillations of enormous frequency well adapted for wireless transmission. The tension of spring S is so adjusted by screw $s$ that the force of the jet will lift the upper electrode sufficiently to produce the necessary series of discharges of the condenser, and if the distance between the electrodes be held constant, by varying the force of the jet through the valve the frequency of the oscillations is varied; the greater the water pressure of the jet, the higher the frequency.

There is no arc formed in this invention, but merely a constantly alternating condition of conductivity and resistance in the jet that allows the condenser to charge and discharge with exceeding rapidity. As an additional function of the jet it will be seen that it serves to keep the electrodes cool.

I am aware that discharges have been made between electrodes submerged in the quiescent liquid of an electrolyte, and I am also aware that electrodes have been cooled by a circulation of water within the same and that a moving body of steam has also been passed between electrodes in the formation of what is known as the "singing arc," and I make no claim to any such methods. In my invention there is no "singing arc," but the electrodes are connected by a minute moving jet of water issuing from one electrode and impinging against the other and varying the oscillations with the varying pressure of the jet.

For the sake of simplicity and clearness I have shown a simple induction coil in my system, but it will be understood that in the place of the induction coil may be used any arrangement of circuit or circuits for wireless communication.

Instead of a jet of water, I may employ as modifications any moving body of water or similar liquid of limited area possessing the same electrical values as to conductivity and resistance. In Fig. 3 a wick $w$ drawing water constantly by capillary action from a subjacent reservoir of water may be employed, the wick being interposed between the terminals of the electrodes; or, as in Fig. 4, two rotating wheels $x$—$y$ may be employed as electrodes, the lower one $x$ running in a body of water and carrying up a superficial film of water through which the discharges are made from one wheel to the other. Many other means may be employed, the essential feature being that a limited body of a liquid, such as water, shall be continuously fed between the electrodes, the limited amount of such liquid serving to produce the unbalanced conditions of alternate conductivity and resistance necessary to produce the discharges, and the continuous supply or feed of the same serving to provide for the constant renewal of the same to compensate for the loss incident to the sputtering volatilization of the liquid and the probable disruption of the same into its detached molecules or constituent elements.

I claim:

1. The method of producing high frequency oscillating currents, which consists in regulating the discharges of a condenser between two electrodes by continuously feeding a small body of liquid of relatively low conductivity, in liquid form, between the electrodes to produce an unbalanced condition of conductivity and resistance.

2. The method of producing high frequency oscillating currents, which consists in regulating the discharges of a condenser between two electrodes by continuously feeding a small body of water in liquid form between the two to produce an unbalanced condition of conductivity and resistance.

3. The method of producing high frequency oscillating currents, which consists in regulating the discharges of a condenser between two electrodes by continuously passing a jet of water from one electrode to the other.

4. The method of producing high frequency oscillating currents, which consists in regulating the discharges of a condenser between two electrodes by a constantly moving jet of water extending from one electrode to the other, and varying the frequency by varying the hydrostatic pressure of the jet.

5. The method of producing high frequency oscillating currents, which consists in regulating the discharges of a condenser between two electrodes by a constantly moving jet of water extending from one electrode to the other, said jet being of a fineness adapted to establish an unbalanced condition of conductivity and resistance for the condenser.

6. The method of producing high frequency oscillating currents, which consists in regulating the discharges of a condenser between two electrodes by a constantly moving jet of water extending from one electrode to the other, and varying the frequency by varying the hydrostatic pressure of the jet, said jet being of a fineness adapted to establish an unbalanced condition of conductivity and resistance for the condenser.

7. An apparatus for producing high frequency oscillating currents, comprising an electric circuit, a condenser having its opposite plates connected to the opposite branches of the circuit, and two electrodes connected respectively with the two branches of the circuit, one of said electrodes being provided with a small issue orifice opposite the other electrode to produce a connecting jet and a water supply pipe.

8. An apparatus for producing high frequency oscillating currents, comprising an electric circuit, a condenser having its opposite plates connected to the opposite branches of the circuit, and two electrodes connected respectively with the two branches of the circuit, one of said electrodes being provided with a small issue orifice opposite the other electrode to produce a connecting jet and a water supply pipe, and means for regulating the pressure and force of the jet.

9. An apparatus for producing high frequency oscillating currents, comprising an electric circuit, a condenser having its opposite plates connected to the opposite branches of the circuit, and two electrodes connected respectively with the two branches of the circuit, one of said electrodes being provided with a small issue orifice opposite the other electrode to produce a connecting jet and a water supply pipe, and said other electrode being yieldingly mounted.

10. An apparatus for producing high frequency oscillating currents, comprising an electric circuit, a condenser having its opposite plates connected to the opposite branches of the circuit and two electrodes connected respectively with the two branches of the circuit, one of said electrodes being provided with a small issue orifice opposite the other electrode to produce a connecting jet and a water supply pipe, and an induction coil having its primary in the circuit and its secondary provided with spark gap terminals.

In testimony whereof I affix my signature in presence of two witnesses.

JAMES H. ROGERS.

Witnesses:
   J. MIDDLETON,
   SOLON C. KEMON.